United States Patent
Shi et al.

(10) Patent No.: US 10,678,054 B1
(45) Date of Patent: Jun. 9, 2020

(54) SEGMENTED BACKLIGHT FOR LIQUID CRYSTAL DISPLAY

(71) Applicant: Facebook Technologies, LLC, Menlo Park, CA (US)

(72) Inventors: Jianru Shi, Union City, CA (US); Fenglin Peng, Orlando, FL (US)

(73) Assignee: Facebook Technologies, LLC, Menlo Park, CA (US)

( * ) Notice: Subject to any disclaimer, the term of this patent is extended or adjusted under 35 U.S.C. 154(b) by 199 days.

(21) Appl. No.: 15/637,931

(22) Filed: Jun. 29, 2017

Related U.S. Application Data

(60) Provisional application No. 62/356,433, filed on Jun. 29, 2016.

(51) Int. Cl.
| | |
|---|---|
| *G02B 27/22* | (2018.01) |
| *G02B 27/01* | (2006.01) |
| *G02F 1/13357* | (2006.01) |
| *G06F 3/01* | (2006.01) |
| *H04N 13/344* | (2018.01) |
| *H04N 13/366* | (2018.01) |
| *G06T 19/00* | (2011.01) |

(52) U.S. Cl.
CPC ..... *G02B 27/0172* (2013.01); *G02B 27/0176* (2013.01); *G02F 1/133603* (2013.01); *G06F 3/012* (2013.01); *H04N 13/344* (2018.05); *H04N 13/366* (2018.05); *G02B 2027/014* (2013.01); *G06T 19/006* (2013.01)

(58) Field of Classification Search
CPC .............. G02B 27/017; G02B 27/0172; G02B 27/0176; G02B 27/0178; G02B 27/01; G02B 27/0093; G02B 2027/014; H04N 13/332; H04N 13/344; H04N 13/366; G02F 1/133602; G02F 1/133603; G06F 3/012; G06T 19/006
USPC ........................................................ 359/462
See application file for complete search history.

(56) References Cited

U.S. PATENT DOCUMENTS

| | | | |
|---|---|---|---|
| 8,089,582 B2 * | 1/2012 | Sekiguchi | G02B 6/0038 349/65 |
| 2008/0030650 A1 * | 2/2008 | Kitagawa | G02B 6/0068 349/65 |
| 2008/0285308 A1 * | 11/2008 | Clary | G02B 6/004 362/619 |
| 2011/0164434 A1 * | 7/2011 | Derichs | G02B 6/0011 362/612 |
| 2013/0321496 A1 * | 12/2013 | Weller | G02B 6/0078 345/694 |

* cited by examiner

*Primary Examiner* — Stephone B Allen
*Assistant Examiner* — Jyotsna V Dabbi
(74) *Attorney, Agent, or Firm* — Fenwick & West LLP

(57) ABSTRACT

A display device includes a liquid crystal layer and a backlight. The liquid crystal layer includes a first liquid crystal portion including a first plurality of pixels, and a second liquid crystal portion including a second plurality of pixels. The backlight includes a first backlight unit corresponding to the first liquid crystal portion, and a second backlight unit corresponding to the second liquid crystal portion. Each backlight unit includes one or more light sources, and a light guide for guiding light generated by the one or more light sources to a respective liquid crystal portion.

18 Claims, 9 Drawing Sheets

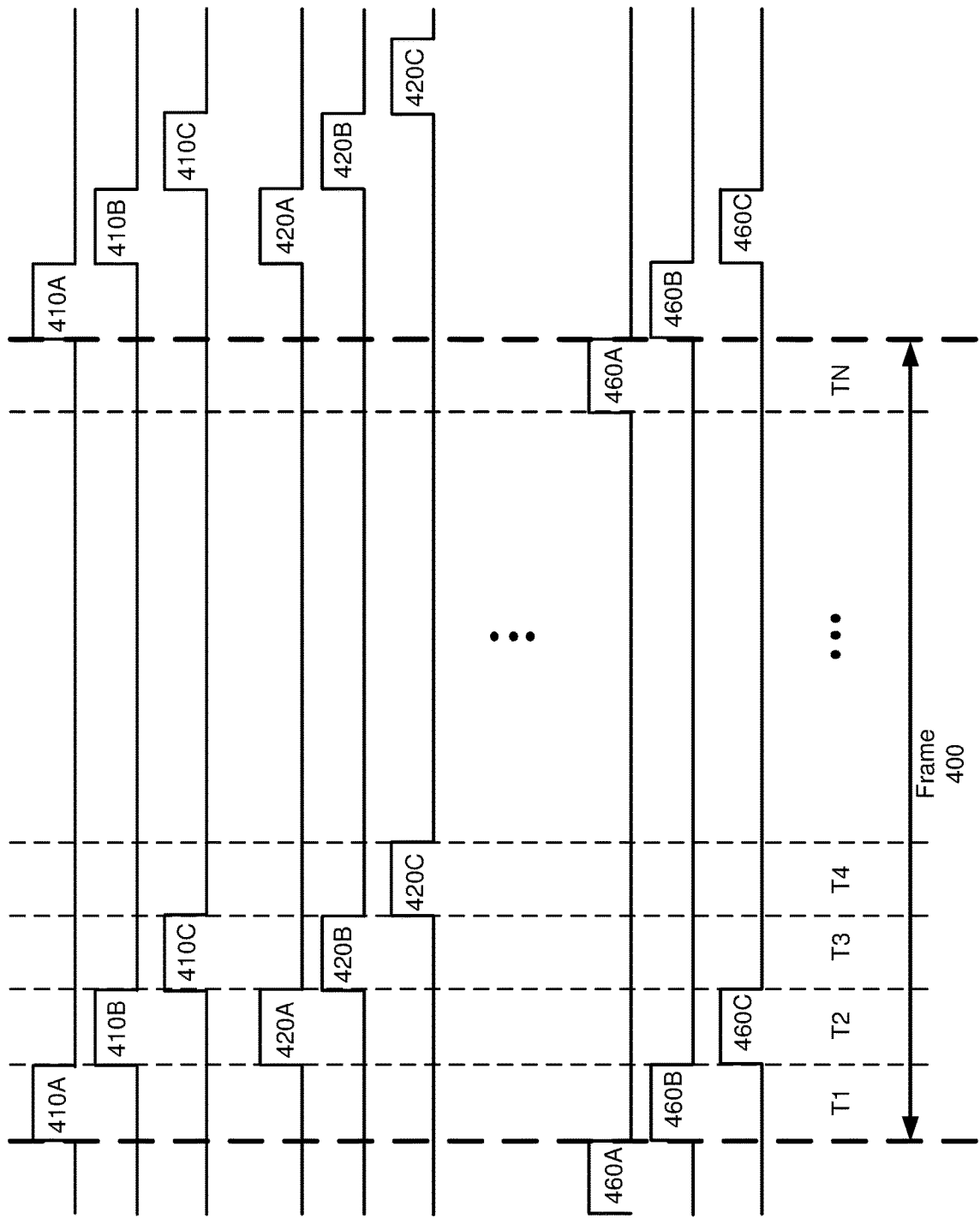

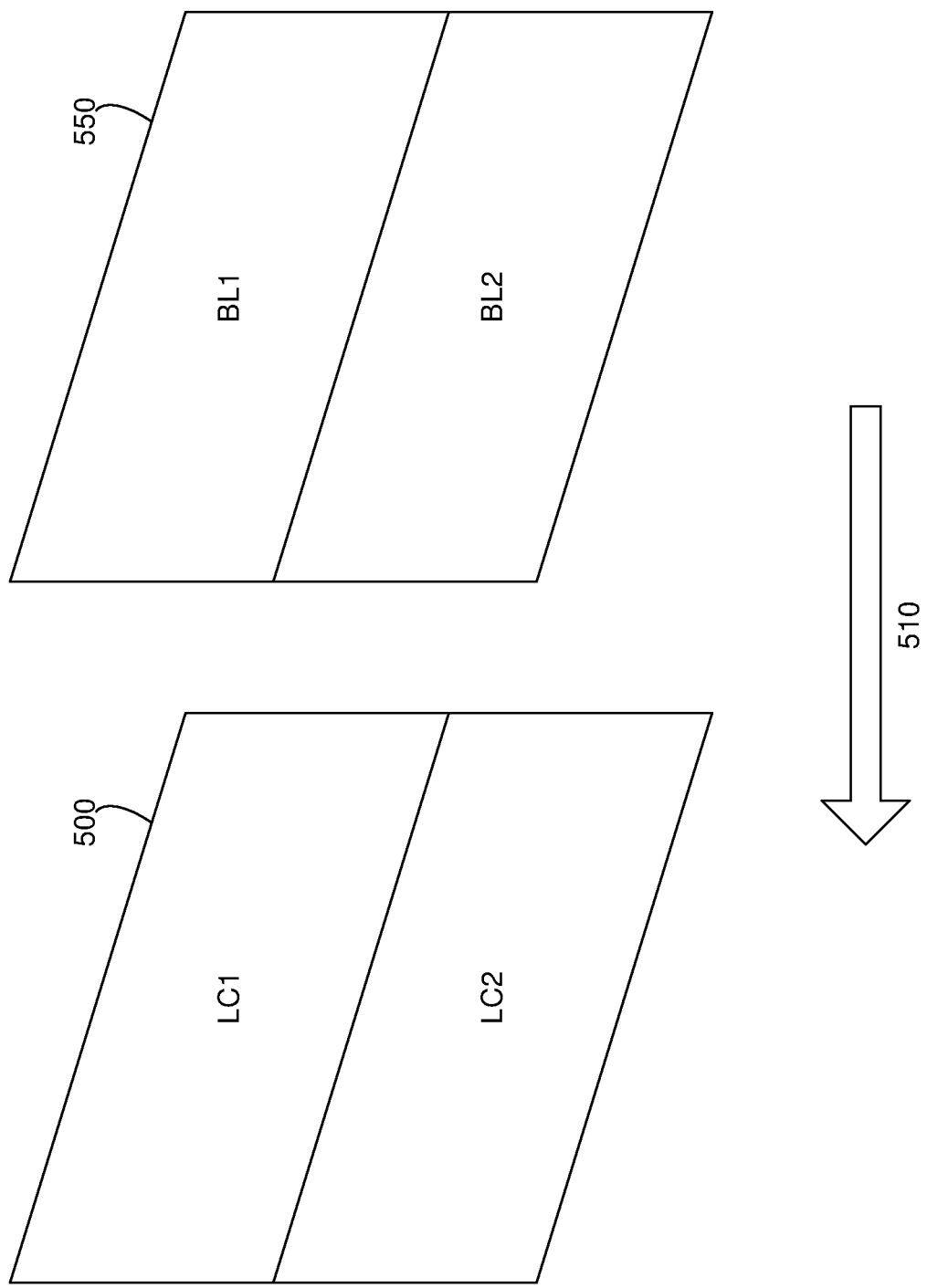

SEGMENTED BACKLIGHT FOR LIQUID CRYSTAL DISPLAY

CROSS REFERENCE TO RELATED APPLICATIONS

This application claims the benefit of U.S. Provisional Application No. 62/356,433, filed Jun. 29, 2016, which is incorporated by reference in its entirety.

BACKGROUND

1. Field of Art

The present disclosure generally relates to a liquid crystal display (LCD) for use in a virtual reality, mixed reality, or augmented reality system.

2. Description of the Related Art

Virtual reality, mixed reality, or augmented reality system uses display devices to display images that augment an environment a user is currently in, or immerse the user into a completely new environment. Oftentimes, users of VR/AR systems experience motion sickness while using a VR/AR headset. The motion sickness can be partially attributed to a latency in the display device when displaying the images rendered by the VR/AR system. Thus, there is a need for a display device with improved latency.

SUMMARY

The latency of a liquid crystal display (LCD) device is reduced by dividing the LCD display device into two sections. Each section includes a liquid crystal segment and a backlight unit. During a first portion of a frame, the liquid crystal segment of a first section is programed while the backlight unit of a second section is driven. Then, during a second portion of the frame, the liquid crystal segment of the second section is programed while the backlight unit of the first section is driven.

In particular, disclosed is a display device that includes a liquid crystal layer and a backlight. The liquid crystal layer includes a first liquid crystal portion including a first plurality of pixels, and a second liquid crystal portion including a second plurality of pixels. The backlight includes a first backlight unit corresponding to the first liquid crystal portion, and a second backlight unit corresponding to the second liquid crystal portion. Each backlight unit includes one or more light sources, and a light guide for guiding light generated by the one or more light sources to a respective liquid crystal portion.

BRIEF DESCRIPTION OF THE DRAWINGS

FIG. 4 is a timing diagram of signals applied to the example electronic display of FIG. 3, in accordance with an embodiment.

FIG. 5 is an exploded view of an example electronic display including a dual backlight unit, in accordance with an embodiment.

Figure 1:
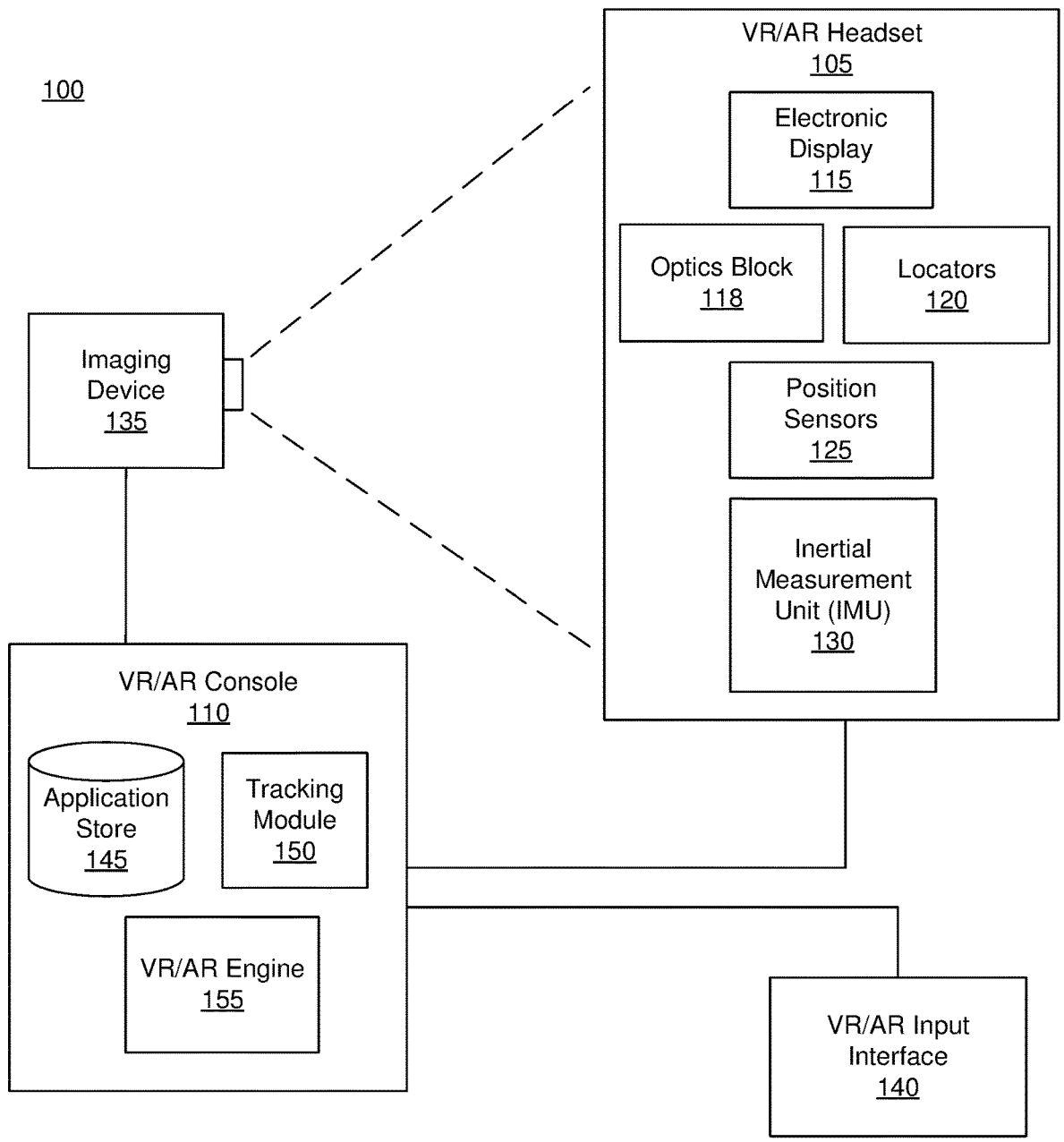
FIG. 1 is a block diagram of a system environment including a virtual reality (VR)/augmented reality (AR) system, in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Configuration Overview

Example embodiments of disclosed configurations include a liquid crystal display with segmented backlight units that can be controlled individually. Segmented backlight units enable a portion of the liquid crystal display to be selectively illuminated. A selected segmented backlight unit can be turned on to illuminate light, while other segmented backlight units are turned off.

In one or more embodiments, (i) programing and transitioning of a state of a liquid crystal in a portion of a liquid crystal layer and (ii) illuminating a segmented backlight unit corresponding to the portion of the liquid crystal layer can occur in an alternating sequence. Specifically, a first portion of the liquid crystal layer can be programed and a state of a liquid crystal in the first portion of the liquid crystal layer can be transitioned according to the programing during a first time period. During a second time period after the first time period, a first segmented backlight unit corresponding to the first portion of the liquid crystal layer can be illuminated, while a second portion of the liquid crystal layer can be programed and a state of a liquid crystal in the second portion of the liquid crystal layer can be transitioned according to the programing. As a result, latency involved for programing a portion of the liquid crystal layer and illuminating light can be reduced.

Programing a liquid crystal herein refer to applying electric signals (e.g., voltage or current) to cause the liquid crystal to be placed in a desired state according to the image data to be displayed on the LCD.

In one application, a liquid crystal display disclosed herein can be implemented in a VR/AR system. In a VR/AR system, a user wears a head mounted display that presents an image of a VR/AR to the user, according to a physical movement of the user. For example, if a user turns his head to the left, a corresponding image of the virtual image is presented to the user, according to the user motion. However, generating the image according to the user movement involves complex processing that is accompanied by a delay between the user movement and the image presented. In case the user moves faster than the delay associated with presenting the image according to the user movement, the user may perceive a feeling of "lag" or a noticeable delay between the user movement and the image presented. By implementing the disclosed liquid crystal display with segmented backlight units, high quality images (e.g., 1080 by 720 pixels or higher) of the VR/AR can be presented to the user without a noticeable lag and motion artifacts.

System Overview

FIG. 1 is a block diagram of a VR/AR system environment 100 in which a VR/AR console 110 operates. The system environment 100 shown by FIG. 1 comprises a VR/AR headset 105, an imaging device 135, and a VR/AR input interface 140 that are each coupled to the VR/AR console 110. While FIG. 1 shows an example system 100 including one VR/AR headset 105, one imaging device 135, and one VR/AR input interface 140, in other embodiments any number of these components may be included in the system 100. For example, there may be multiple VR/AR headsets 105 each having an associated VR/AR input interface 140 and being monitored by one or more imaging devices 135, with each VR/AR headset 105, VR/AR input interface 140, and imaging devices 135 communicating with the VR/AR console 110. In alternative configurations, different and/or additional components may be included in the system environment 100.

The VR/AR headset 105 is a head-mounted display that presents media to a user. Examples of media presented by the VR/AR head set include one or more images, video, audio, or some combination thereof. In some embodiments, audio is presented via an external device (e.g., speakers and/or headphones) that receives audio information from the VR/AR headset 105, the VR/AR console 110, or both, and presents audio data based on the audio information. An embodiment of the VR/AR headset 105 is further described below in conjunction with FIGS. 2A and 2B. The VR/AR headset 105 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other.

The VR/AR headset 105 includes an electronic display 115, an optics block 118, one or more locators 120, one or more position sensors 125, and an inertial measurement unit (IMU) 130. The electronic display 115 displays images to the user in accordance with data received from the VR/AR console 110. In various embodiments, the electronic display 115 may comprise a single electronic display or multiple electronic displays (e.g., an electronic display for each eye of a user). The electronic display 115 may be a liquid crystal display (LCD) as described in detail with respect to FIG. 3 below.

The optics block 118 magnifies received light from the electronic display 115, corrects optical errors associated with the image light, and the corrected image light is presented to a user of the VR/AR headset 105. An optical element may be an aperture, a Fresnel lens, a convex lens, a concave lens, a filter, or any other suitable optical element that affects the image light emitted from the electronic display 115. Moreover, the optics block 118 may include combinations of different optical elements. In some embodiments, one or more of the optical elements in the optics block 118 may have one or more coatings, such as anti-reflective coatings.

Magnification of the image light by the optics block 118 allows the electronic display 115 to be physically smaller, weigh less, and consume less power than larger displays. Additionally, magnification may increase a field of view of the displayed media. For example, the field of view of the displayed media is such that the displayed media is presented using almost all (e.g., 110 degrees diagonal), and in some cases all, of the user's field of view. In some embodiments, the optics block 118 is designed so its effective focal length is larger than the spacing to the electronic display 115, which magnifies the image light projected by the electronic display 115. Additionally, in some embodiments, the amount of magnification may be adjusted by adding or removing optical elements.

The optics block 118 may be designed to correct one or more types of optical error. Examples of optical error include: two dimensional optical errors, three dimensional optical errors, or some combination thereof. Two dimensional errors are optical aberrations that occur in two dimensions. Example types of two dimensional errors include: barrel distortion, pincushion distortion, longitudinal chromatic aberration, transverse chromatic aberration, or any other type of two-dimensional optical error. Three dimensional errors are optical errors that occur in three dimensions. Example types of three dimensional errors include spherical aberration, comatic aberration, field curvature, astigmatism, or any other type of three-dimensional optical error. In some embodiments, content provided to the electronic display 115 for display is pre-distorted, and the optics block 118 corrects the distortion when it receives image light from the electronic display 115 generated based on the content.

The locators 120 are objects located in specific positions on the VR/AR headset 105 relative to one another and relative to a specific reference point on the VR/AR headset 105. A locator 120 may be a light emitting diode (LED), a corner cube reflector, a reflective marker, a type of light source that contrasts with an environment in which the VR/AR headset 105 operates, or some combination thereof. In embodiments where the locators 120 are active (i.e., an LED or other type of light emitting device), the locators 120 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the locators 120 are located beneath an outer surface of the VR/AR headset 105, which is transparent to the wavelengths of light emitted or reflected by the locators 120 or is thin enough not to substantially attenuate the wavelengths of light emitted or reflected by the locators 120. Additionally, in some embodiments, the outer surface or other portions of the VR/AR headset 105 are opaque in the visible band of wavelengths of light. Thus, the locators 120 may emit light in the IR band under an outer surface that is transparent in the IR band but opaque in the visible band.

The IMU 130 is an electronic device that generates fast calibration data based on measurement signals received from one or more of the position sensors 125. A position sensor 125 generates one or more measurement signals in response to motion of the VR/AR headset 105. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof.

Based on the one or more measurement signals from one or more position sensors 125, the IMU 130 generates fast calibration data indicating an estimated position of the VR/AR headset 105 relative to an initial position of the VR/AR headset 105. For example, the position sensors 125 include multiple accelerometers to measure translational motion (forward/back, up/down, left/right) and multiple gyroscopes to measure rotational motion (e.g., pitch, yaw, roll). In some embodiments, the IMU 130 rapidly samples the measurement signals and calculates the estimated position of the VR/AR headset 105 from the sampled data. For example, the IMU 130 integrates the measurement signals received from the accelerometers over time to estimate a velocity vector and integrates the velocity vector over time to determine an estimated position of a reference point on the VR/AR headset 105. Alternatively, the IMU 130 provides the sampled measurement signals to the VR/AR console 110, which determines the fast calibration data. The reference point is a point that may be used to describe the position of the VR/AR headset 105. While the reference point may generally be defined as a point in space; however, in practice the reference point is defined as a point within the VR/AR headset 105 (e.g., a center of the IMU 130).

The IMU 130 receives one or more calibration parameters from the VR/AR console 110. As further discussed below, the one or more calibration parameters are used to maintain tracking of the VR/AR headset 105. Based on a received calibration parameter, the IMU 130 may adjust one or more IMU parameters (e.g., sample rate). In some embodiments, certain calibration parameters cause the IMU 130 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The imaging device 135 generates slow calibration data in accordance with calibration parameters received from the VR/AR console 110. Slow calibration data includes one or more images showing observed positions of the locators 120 that are detectable by the imaging device 135. The imaging device 135 may include one or more cameras, one or more video cameras, any other device capable of capturing images including one or more of the locators 120, or some combination thereof. Additionally, the imaging device 135 may include one or more filters (e.g., used to increase signal to noise ratio). The imaging device 135 is configured to detect light emitted or reflected from locators 120 in a field of view of the imaging device 135. In embodiments where the locators 120 include passive elements (e.g., a retroreflector), the imaging device 135 may include a light source that illuminates some or all of the locators 120, which retro-reflect the light towards the light source in the imaging device 135. Slow calibration data is communicated from the imaging device 135 to the VR/AR console 110, and the imaging device 135 receives one or more calibration parameters from the VR/AR console 110 to adjust one or more imaging parameters (e.g., focal length, focus, frame rate, ISO, sensor temperature, shutter speed, aperture, etc.).

The VR/AR input interface 140 is a device that allows a user to send action requests to the VR/AR console 110. An action request is a request to perform a particular action. For example, an action request may be to start or end an application or to perform a particular action within the application. The VR/AR input interface 140 may include one or more input devices. Example input devices include: a keyboard, a mouse, a game controller, or any other suitable device for receiving action requests and communicating the received action requests to the VR/AR console 110. An action request received by the VR/AR input interface 140 is communicated to the VR/AR console 110, which performs an action corresponding to the action request. In some embodiments, the VR/AR input interface 140 may provide haptic feedback to the user in accordance with instructions received from the VR/AR console 110. For example, haptic feedback is provided when an action request is received, or the VR/AR console 110 communicates instructions to the VR/AR input interface 140 causing the VR/AR input interface 140 to generate haptic feedback when the VR/AR console 110 performs an action.

The VR/AR console 110 provides media to the VR/AR headset 105 for presentation to the user in accordance with information received from one or more of: the imaging device 135, the VR/AR headset 105, and the VR/AR input interface 140. In the example shown in FIG. 1, the VR/AR console 110 includes an application store 145, a tracking module 150, and a VR/AR engine 155. Some embodiments of the VR/AR console 110 have different modules than those described in conjunction with FIG. 1. Similarly, the functions further described below may be distributed among components of the VR/AR console 110 in a different manner than is described here.

The application store 145 stores one or more applications for execution by the VR/AR console 110. An application is a group of instructions, that when executed by a processor, generates content for presentation to the user. Content generated by an application may be in response to inputs received from the user via movement of the VR/AR headset 105 or the VR/AR input interface 140. Examples of applications include: gaming applications, conferencing applications, video playback application, or other suitable applications.

The tracking module 150 calibrates the VR/AR system 100 using one or more calibration parameters and may adjust one or more calibration parameters to reduce error in determination of the position of the VR/AR headset 105. For example, the tracking module 150 adjusts the focus of the imaging device 135 to obtain a more accurate position for observed locators on the VR/AR headset 105. Moreover, calibration performed by the tracking module 150 also accounts for information received from the IMU 130. Additionally, if tracking of the VR/AR headset 105 is lost (e.g., the imaging device 135 loses line of sight of at least a threshold number of the locators 120), the tracking module 150 re-calibrates some or all of the system environment 100.

The tracking module 150 tracks movements of the VR/AR headset 105 using slow calibration information from the imaging device 135. The tracking module 150 determines positions of a reference point of the VR/AR headset 105 using observed locators from the slow calibration information and a model of the VR/AR headset 105. The tracking module 150 also determines positions of a reference point of the VR/AR headset 105 using position information from the fast calibration information. Additionally, in some embodiments, the tracking module 150 may use portions of the fast calibration information, the slow calibration information, or some combination thereof, to predict a future location of the headset 105. The tracking module 150 provides the estimated or predicted future position of the VR/AR headset 105 to the VR/AR engine 155.

The VR/AR engine 155 executes applications within the system environment 100 and receives position information, acceleration information, velocity information, predicted future positions, or some combination thereof of the VR/AR headset 105 from the tracking module 150. Based on the received information, the VR/AR engine 155 determines content to provide to the VR/AR headset 105 for presentation to the user. For example, if the received information indicates that the user has looked to the left, the VR/AR engine 155 generates content for the VR/AR headset 105 that mirrors the user's movement in a virtual environment. Additionally, the VR/AR engine 155 performs an action within an application executing on the VR/AR console 110 in response to an action request received from the VR/AR input interface 140 and provides feedback to the user that the action was performed. The provided feedback may be visual or audible feedback via the VR/AR headset 105 or haptic feedback via the VR/AR input interface 140.

Figure 2A:
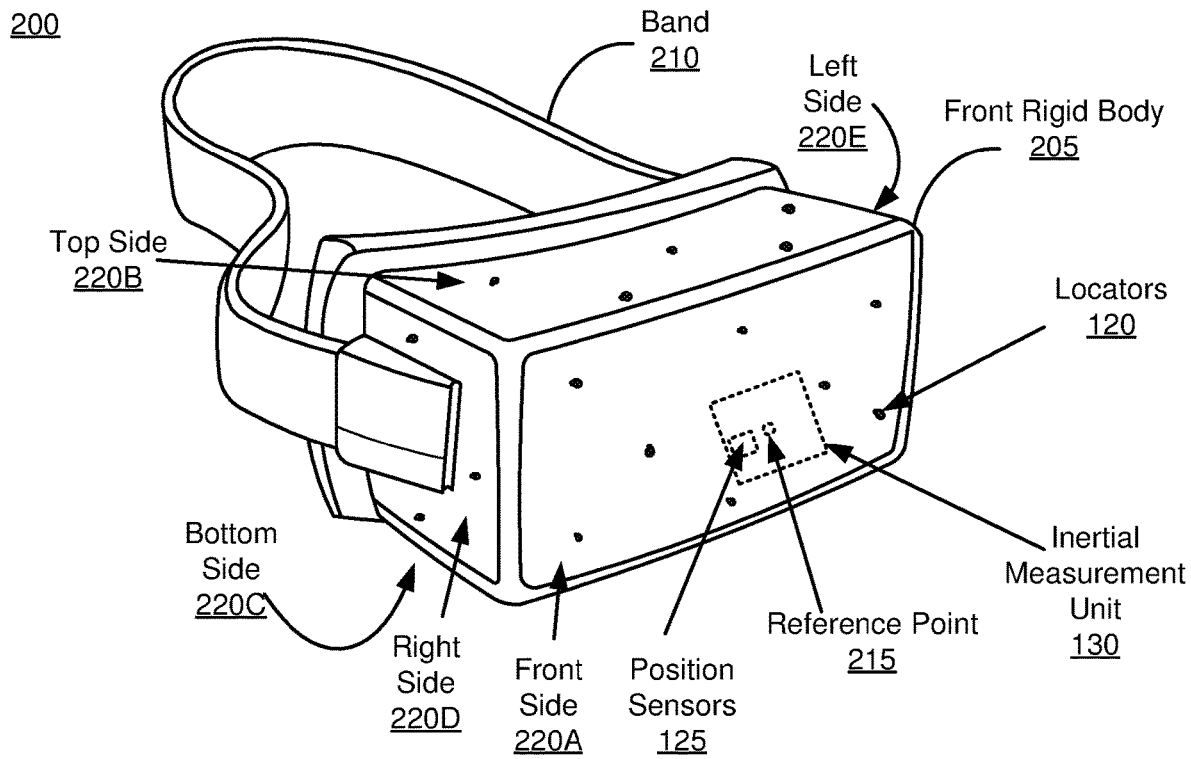
FIG. 2A is a diagram of a VR/AR headset, in accordance with an embodiment.

FIG. 2A is a diagram of a VR/AR headset, in accordance with an embodiment. The VR/AR headset 200 is an embodiment of the VR/AR headset 105, and includes a front rigid body 205 and a band 210. The front rigid body 205 includes an electronic display 115, the IMU 130, the one or more position sensors 125, and the locators 120. In the embodiment shown by FIG. 2A, the position sensors 125 are located within the IMU 130, and neither the IMU 130 nor the position sensors 125 are visible to the user.

The locators 120 are located in fixed positions on the front rigid body 205 relative to one another and relative to a reference point 215. In the example of FIG. 2A, the reference point 215 is located at the center of the IMU 130. Each of the locators 120 emit light that is detectable by the imaging device 135. Locators 120, or portions of locators 120, are located on a front side 220A, a top side 220B, a bottom side 220C, a right side 220D, and a left side 220E of the front rigid body 205 in the example of FIG. 2A.

Figure 2B:
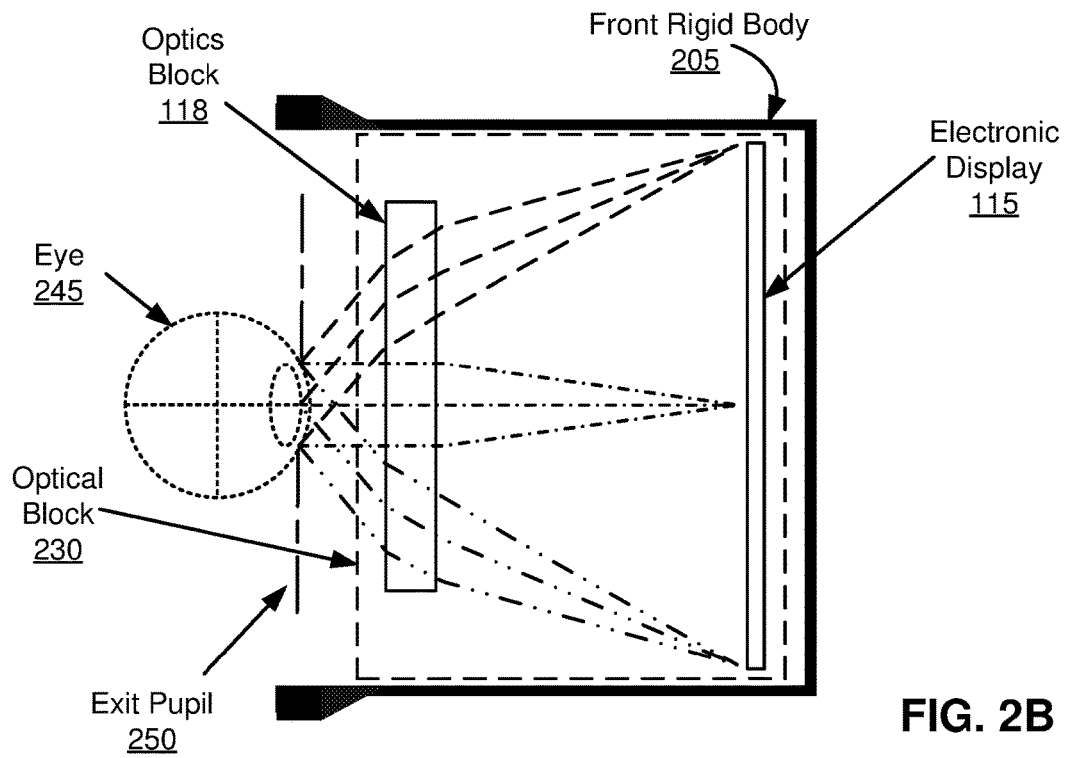
FIG. 2B is a cross section of a front rigid body of the VR/AR headset in FIG. 2A, in accordance with an embodiment.

FIG. 2B is a cross section 225 of the front rigid body 205 of the embodiment of a VR/AR headset 200 shown in FIG. 2A. As shown in FIG. 2B, the front rigid body 205 includes an optical block 230 that provides altered image light to an exit pupil 250. The exit pupil 250 is the location of the front rigid body 205 where a user's eye 245 is positioned. For purposes of illustration, FIG. 2B shows a cross section 225 associated with a single eye 245, but another optical block, separate from the optical block 230, provides altered image light to another eye of the user.

The optical block 230 includes an electronic display 115, and the optics block 118. The electronic display 115 emits image light toward the optics block 118. The optics block 118 magnifies the image light, and in some embodiments, also corrects for one or more additional optical errors (e.g., distortion, astigmatism, etc.). The optics block 118 directs the image light to the exit pupil 250 for presentation to the user.

Figure 3:
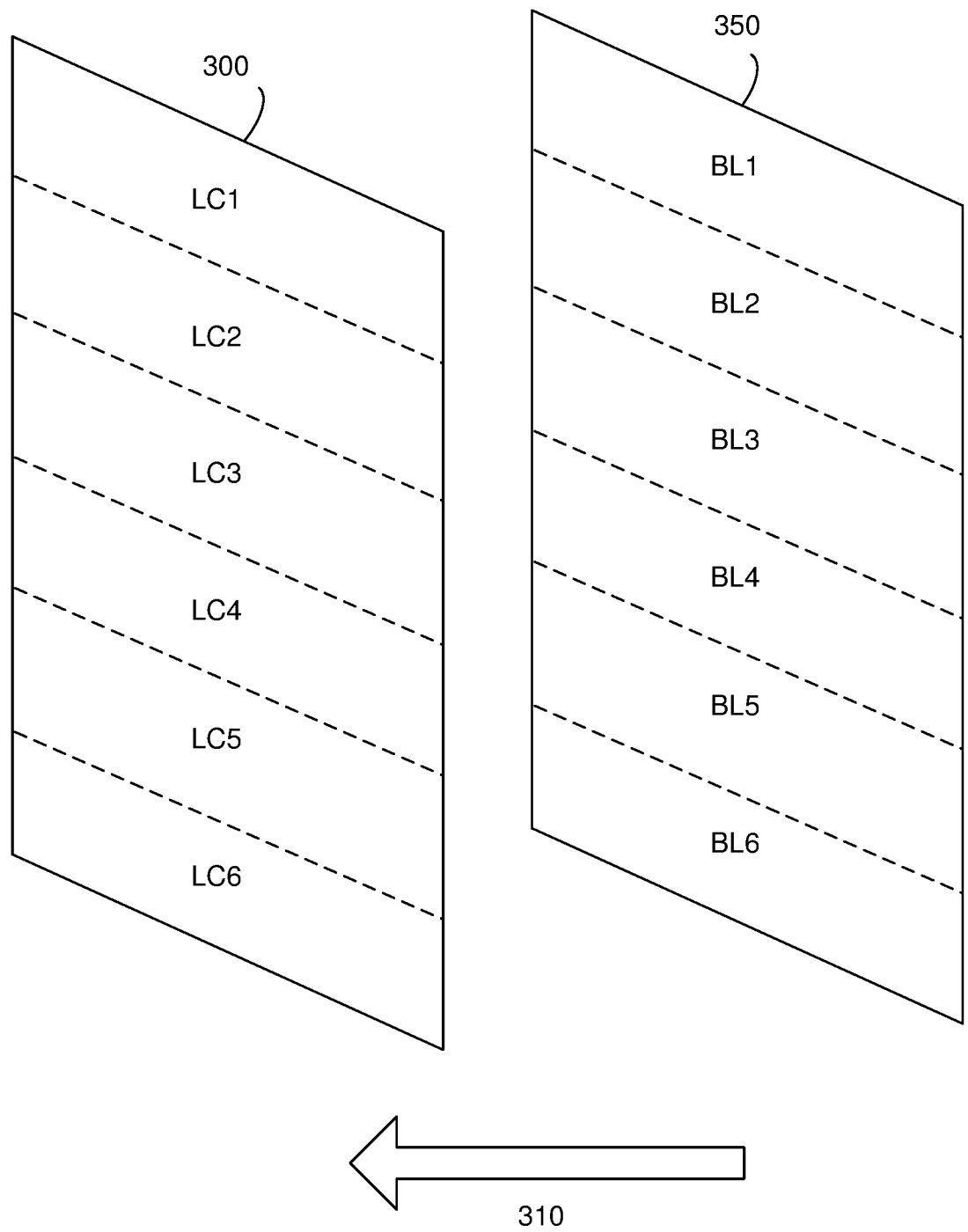
FIG. 3 is an exploded view of an example electronic display including segmented backlight units, in accordance with an embodiment.

FIG. 3 is an exploded view of an example liquid crystal display 115 including segmented backlight units, in accordance with an embodiment. The electronic display 115 includes a liquid crystal layer 300, and a backlight 350. The backlight 350 illuminates light towards the liquid crystal layer 300, and the liquid crystal layer 300 controls an amount and location of light passing through the liquid crystal layer 300 towards the exit pupil 250 in a direction 310.

The backlight 350 comprises a plurality of segmented backlight units. In the example shown in FIG. 3, the backlight 350 is segmented into backlight units BL1, BL2 . . . BL6. In this example, the backlight units BL1, BL2 . . . BL6 are arranged in a row direction in a manner that a bottom side of a backlight unit BL is coupled to a top side of its adjacent backlight unit BL (e.g., a bottom side of the backlight unit BL1 is coupled to a top side of the backlight unit BL2). Backlight units BL are physically separated by air gaps, dielectric coatings, or other components to prevent light generated by a backlight unit from traversing or leaking to another adjacent backlight unit. Backlight elements, such as brightness enhancing films, diffusers, reflectors, may or may not be shared between the backlight units. Although the backlight 350 in FIG. 3 is segmented into six backlight units, in other examples, the backlight 350 can include a different number of segmented backlight units, or segmented into different spatial portions than shown in FIG. 3. In one implementation, homogenizing strips can be disposed on portions of a surface of the backlight 350 at which two backlight units BL adjoin for diffusing light from the two backlight units BL. Backlight units may have non-uniform illumination patterns. By implementing homogenizing strips, net illumination of two or more backlight units (or all backlight units) can be uniform.

Each backlight unit BL includes a light guide and one or more light sources coupled to the light guide. A light source may be disposed on a side of its corresponding light guide between a top side and a bottom side. Alternatively, the light source may be coupled to any side or a surface of the light guide (e.g., a bottom surface away from the liquid crystal layer 300). Examples of a light source include a light bulb, a light emitting diode, or any component that is capable of emitting light. A light guide receives light from a light source, and projects the received light toward the liquid crystal layer 300. Each light source can be controlled individually by its own light source driver to enable only a light guide of a selected backlight unit to illuminate light toward the liquid crystal layer 300 in the direction 310.

The liquid crystal layer 300 includes a plurality of pixels formed by liquid crystals for controlling an amount of light passing through the liquid crystal layer 300 from the backlight 350. States of liquid crystals can be programed and controlled according to signals generated from a data driver (not shown for simplicity) based on image data transmitted from the VR/AR engine 155. In the example shown in FIG. 3, the liquid crystal layer 300 is programed in units of a plurality of segmented liquid crystal portions LC1, LC2 . . . LC6. In this example, each of the liquid crystal portions LC1, LC2 . . . LC6 corresponds to a respective one of the backlight units BL1, BL2 . . . BL6, and overlaps with a corresponding backlight unit. Although the liquid crystal layer 300 in FIG. 3 is segmented into six liquid crystal portions, in other examples, the liquid crystal layer 300 can include a different number of segmented liquid crystal portions. In other examples, two or more of the liquid crystal portions correspond to and overlap with a single backlight unit.

FIG. 4 is a timing diagram of signals applied to the example electronic display of FIG. 3, in accordance with an embodiment. The data driver (not shown for simplicity) applies signals or pulses 410A, 410B, 420A, 420B . . . 460A, 460B (often called "data voltages") to liquid crystal layer 300 and pulses 410C, 420C . . . 460C to the backlight 350 for displaying an image for a time frame 400 (e.g., 11 ms).

In one embodiment, (i) programming and transitioning of states of liquid crystals in a liquid crystal portion LC and (ii) illuminating a corresponding backlight unit BL can occur in an alternating sequence. Specifically, a pulse 410A is provided to the liquid crystal portion LC1 to program the liquid crystal portion LC1 during a time period T1. After the liquid crystal portion LC1 is programed, a pulse 410B is provided to the liquid crystal portion LC1 to transition states of liquid crystals in the liquid crystal portion LC1 during a time period T2. After transitioning states of the liquid crystals in the liquid crystal portion LC1, a pulse 410C is provided to the backlight unit BL1 to illuminate the backlight unit BL1 during a time period T3.

While the states of the liquid crystals in the liquid crystal portion LC1 are transitioned, a pulse 420A is provided to the liquid crystal portion LC2 to program the liquid crystal portion LC2 during a time period T2. In addition, a pulse 420B is provided to the liquid crystal portion LC2 to transition states of liquid crystals in the liquid crystal portion LC2 during a time period T3, while the backlight unit BL1 illuminates light. After states of the liquid crystals in the liquid crystal portion LC2 are transitioned, a pulse 420C is provided to the backlight portion BL2 to illuminate the backlight portion BL2 during a time period T4.

For a last liquid crystal portion and a backlight unit (e.g., LC6 and BL6), a pulse 460A of the time frame 400 is provided to the last liquid crystal portion (e.g., LC6) to program the last liquid crystal portion (e.g., LC6) during a last time period TN of the time frame 400. A pulse 460B of the time frame 400 is provided to the last liquid crystal portion (e.g., LC6) to transition states of liquid crystals in the last liquid crystal portion, while the pulse 410A of the next time frame 400 is provided to the liquid crystal portion LC1 to program the liquid crystal portion LC1 during a time period T1 of the next time frame 400. In addition, a pulse 460C of the time frame is provided to the last backlight unit (e.g., BL6) to illuminate the last backlight unit (e.g., BL6), while the pulse 410B of the next time frame 400 is provided to the liquid crystal portion LC1 to transition states of liquid crystals in the liquid crystal portion LC1 during a time period T2 of the next time frame 400. Accordingly, a portion of an image corresponding to the last liquid crystal portion and the last backlight unit (e.g., LC6 and BL6) is displayed, while the first liquid crystal portion LC1 is programed.

In another embodiment, state transitions occur automatically after programing, thus pulses 410B, 420B . . . 460B for transitioning states of liquid crystals may be omitted. In this embodiment, time periods for programing liquid crystals and transitioning states of the liquid crystals can be combined into a single time period.

Advantageously, by segmenting the liquid crystal layer 300 and backlight 350 as shown in FIG. 3, and displaying an image as shown in FIG. 4, latency involved for programing a portion of the liquid crystal layer and illuminating light can be reduced. Accordingly, high quality images (e.g., 1080 by 720 pixels or higher) can be presented to the user in response to the user motion without a noticeable lag to provide a seamless VR/AR experience to the user.

Dual Backlight Unit

FIG. 5 is an exploded view of an example electronic display including a dual backlight unit, in accordance with an embodiment. The electronic display 115 includes a liquid crystal layer 500, and a backlight unit 550. The backlight unit 550 illuminates light towards the liquid crystal layer 500, and the liquid crystal layer 500 controls an amount and location of light passing through the liquid crystal layer 500 towards the exit pupil 250 in a direction 510.

The backlight unit 550 includes a first segmented backlight unit BL1 and a second segmented backlight unit BL2. The first segmented backlight unit BL1 and the second segmented backlight unit BL2 are separated by an air gap, a dielectric coating, or another component that prevents light generated by a backlight unit from traversing or leaking to another adjacent backlight unit. In some embodiments, a diffuser may be used to hide the boundary between the first segmented backlight unit BL1 and the second segmented backlight unit BL2.

The liquid crystal layer 500 includes a first segmented liquid crystal portion LC1 and a second segmented liquid crystal portion LC2. The first segmented liquid crystal portion controls the amount of light emitted by the first segmented backlight unit BL1 passing through the liquid crystal layer 500. The second segmented liquid crystal portion controls the amount of light emitted by the second segmented backlight unit BL2 passing through the liquid crystal layer 500.

Figure 6A:
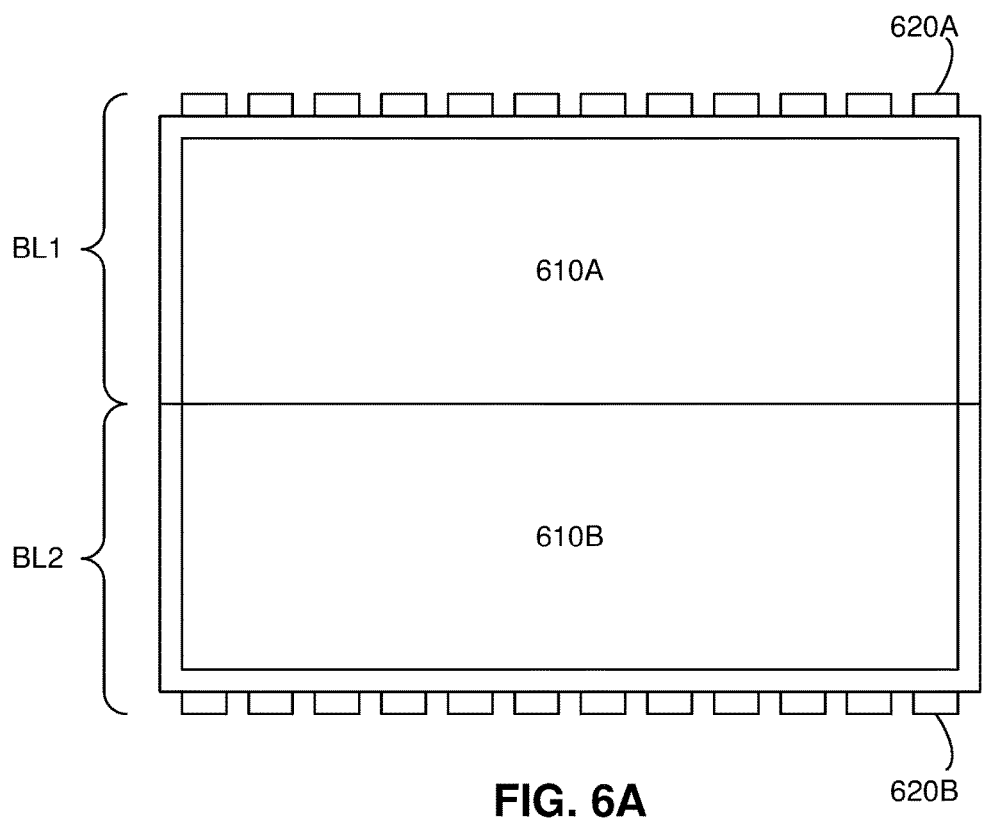
FIG. 6A is a top view of the dual backlight unit of FIG. 5, in accordance with an embodiment.
Figure 6B:
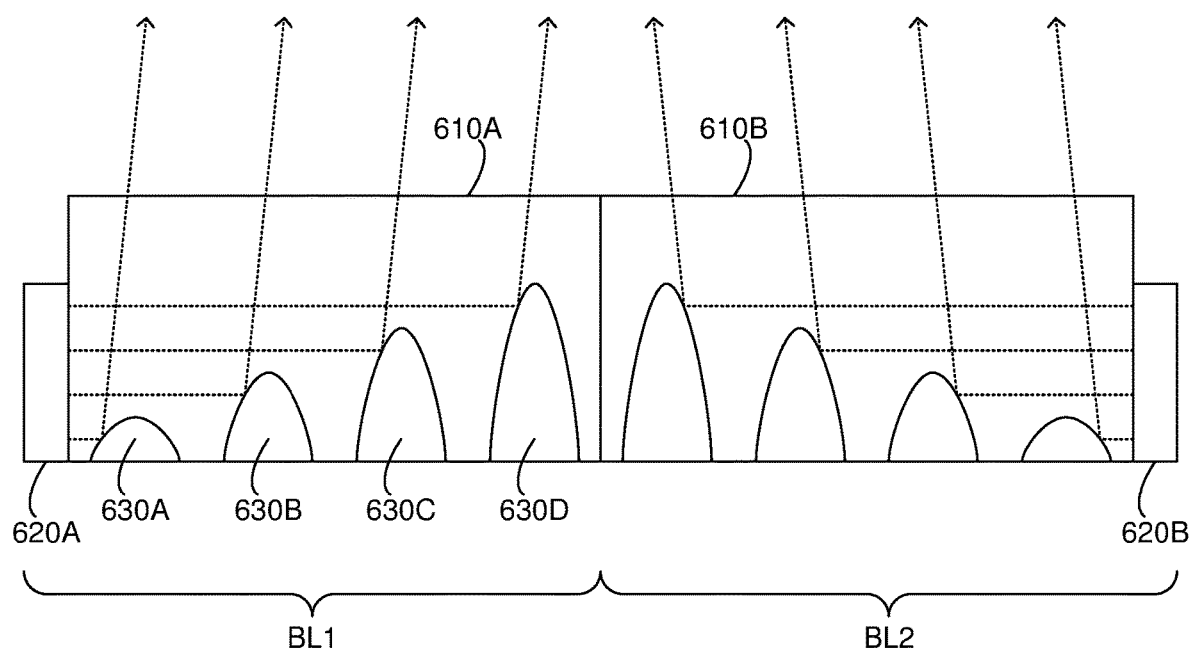
FIG. 6B is a cross sectional view of the dual backlight unit of FIG. 5, in accordance with an embodiment.

FIG. 6A is a top view of the dual backlight unit of FIG. 5, in accordance with an embodiment. FIG. 6B is a cross sectional view of the dual backlight unit of FIG. 5, in accordance with an embodiment. The example of FIG. 6A illustrates the first and second segmented backlight units BL1 and BL2 configured horizontally (i.e., the first segmented backlight unit BL1 being on top and the second segmented backlight unit BL2 being on the bottom), but other configuration, such as, a vertical configuration, where the first segmented backlight unit BL1 is on the left and the second segmented backlight unit BL2 is on the right may be used instead. Each segmented backlight unit BL1 and BL2 includes one or more light sources 620 (e.g., light emitting diodes LEDs) and a light guide 610. In the backlight unit configuration of FIG. 6A, the first segmented backlight unit BL1 includes a light guide 610A and multiple light sources 620 on top of the light guide 610A, and the second segmented backlight unit BL2 includes a light guide 610B and multiple light sources 620 at the bottom of the light guide 610B. Furthermore, each light guide includes multiple scattering elements 630. For instance, the light guide 610A of FIG. 6B includes four scattering elements 630A, 630B, 630C, and 630D. To increase the uniformity of the light outputted by the backlight unit, as the distance between a scattering element 630 and a light source 620 increases, the scattering elements 630 may be adjusted to account for a reduction in the intensity of the light that reaches the scattering elements 630. In one embodiment, a density of scattering elements 630 may be increased to account for the reduction in the intensity of the light that reaches the scattering elements. In other embodiments, a size of the scattering elements may also be adjusted to account for a reduction in light that reaches the scattering elements.

In the embodiment of FIG. 6A, the backlight unit is split in the direction of the longer side of the electronic display 115. Dividing the backlight unit in the direction of the longer side allows the light sources 620 to be placed on the edge of the backlight unit along the longer side of the backlight unit. In this way, the light emitted from the light sources travels half of the length of the shorter side of the electronic display 115. Alternatively, the light emitters can be placed on the two shorter sides of the electronic display 115.

Figure 7:
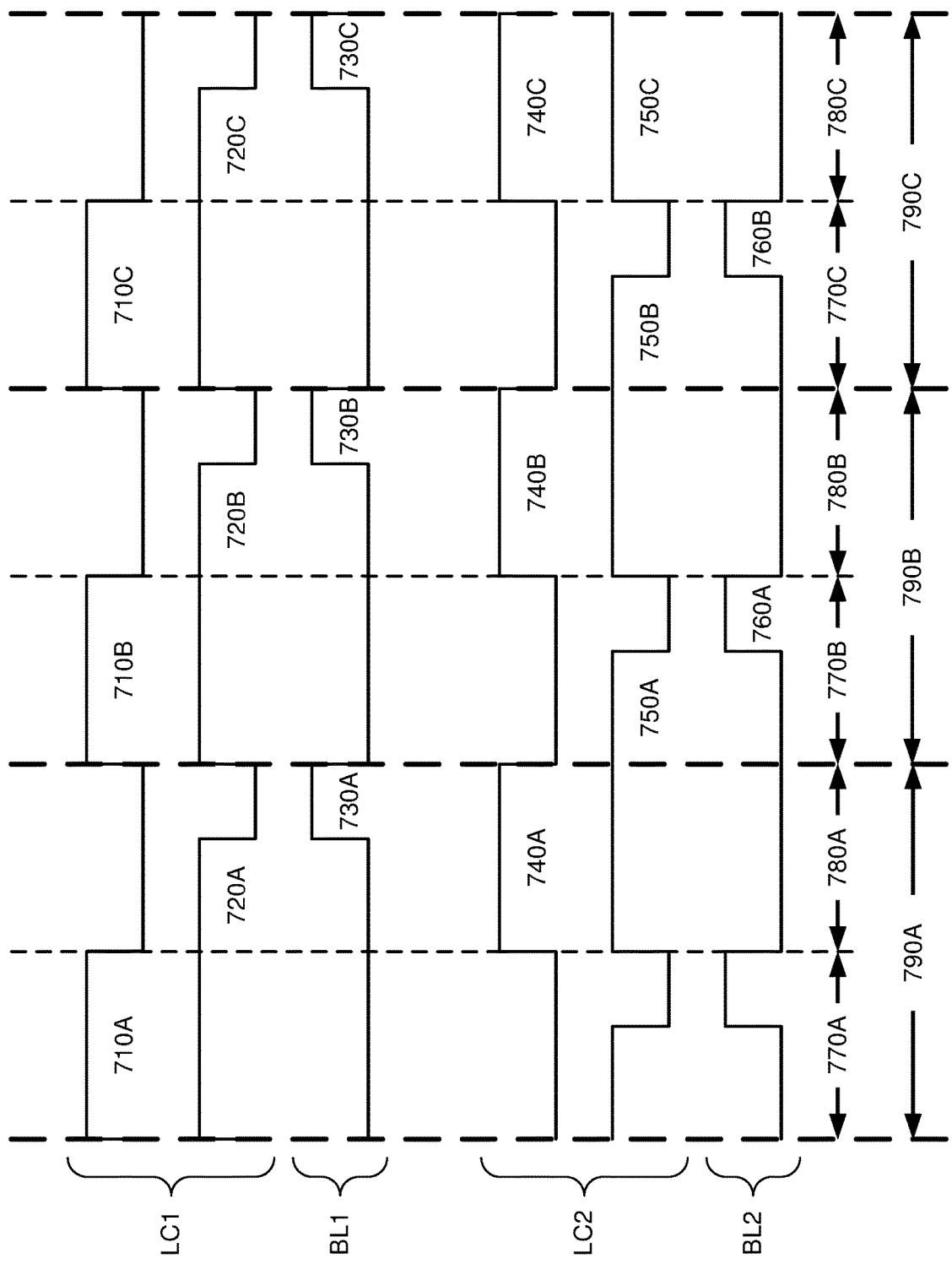
FIG. 7 is a timing diagram of signals applied to the example electronic display of FIG. 5, in accordance with an embodiment.

FIG. 7 is a timing diagram of signals applied to the example electronic display of FIG. 5, in accordance with an embodiment. The data driver (not shown for simplicity) applies signals or pulses 710, 720, 740, and 750 to liquid crystal layer 500, and pulses 730 and 760 to the backlight 550 for displaying images during time frames 790. The data driver applies signal 710 to the liquid crystal portion LC1 during a first half 770 of frame 790 to program the liquid crystal portion LC1, and applies signal 740 to liquid crystal portion LC2 during a second half 780 of frame 790 to program the liquid crystal portion LC2. The data driver further provides pulse 720 to liquid crystal portion LC1 to transition states of liquid crystals in the liquid crystal portion LC1, and provides pulse 730 to the backlight unit BL1 to illuminate the backlight unit BL1 after pulse 720 has been provided to liquid crystal portion LC1. The data driver also applies pulse 750 to liquid crystal portion LC2 to transition states of liquid crystals in the liquid crystal portion LC2, and provides pulse 760 to the backlight unit BL2 to illuminate the backlight unit BL2 after pulse 750 has been provided to liquid crystal portion LC2.

As such, in the embodiment of FIG. 7, the liquid crystals of liquid crystal portion LC1 transition states and the backlight unit BL1 is illuminated during the second half 780A of frame 790A, while liquid crystal portion LC2 is being programed. Liquid crystals of liquid crystal portion LC2 transition states and the backlight unit BL2 is illuminated during the first half 770B of frame 790B, while liquid crystal portion LC1 is being programed.

Figure 8:
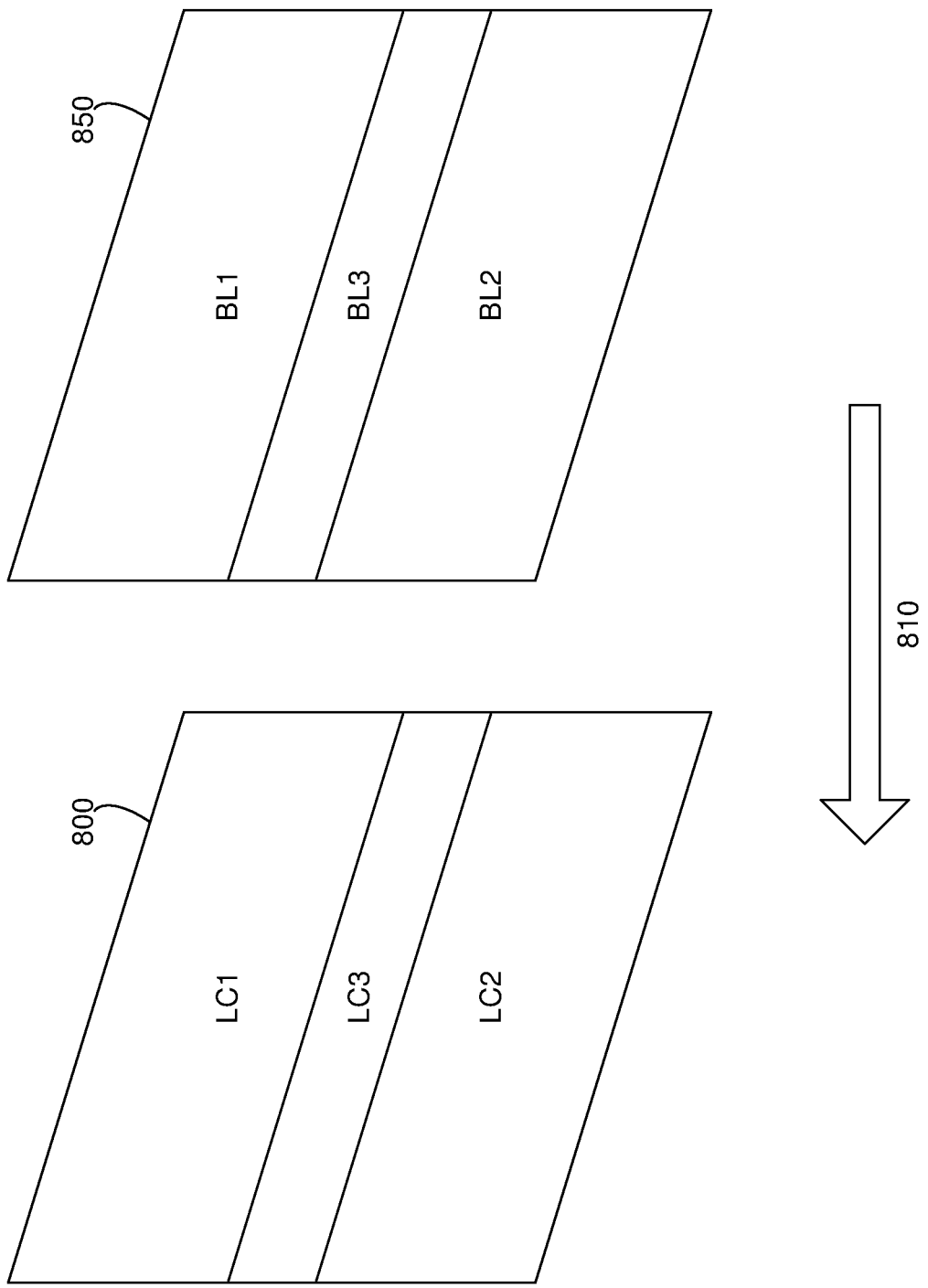
FIG. 8 is an exploded view of an example electronic display 115 including three backlight units, in accordance with an embodiment.

FIG. 8 is an exploded view of an example electronic display 115 including three segmented backlight units, in accordance with an embodiment. The electronic display 115 includes a liquid crystal layer 800 and a backlight unit 850. The backlight unit 850 illuminates light towards the liquid crystal layer 800, and the liquid crystal layer 800 controls an amount and location of light passing through the liquid crystal layer 800 towards the exit pupil 250 in a direction 810.

The backlight unit 850 includes a first segmented backlight unit BL1, a second backlight unit BL2, and a third backlight unit BL3 located in between the first and second backlight units BL1 and BL2. The liquid crystal layer 800 includes a first segmented liquid crystal portion LC1, a second segmented liquid crystal portion LC2, and a third segmented liquid crystal portion LC3 located in between the first and second segmented liquid crystal portion LC1 and LC2. The first segmented liquid crystal portion LC1 controls the amount of light emitted by the first segmented backlight unit BL1 passing through the liquid crystal layer 800, the second segmented liquid crystal portion LC2 controls the amount of light emitted by the second segmented backlight unit BL2 passing through the liquid crystal layer 800, and the third segmented liquid crystal portion LC3 controls the amount of light emitted by the third segmented backlight unit BL3.

Figure 9:
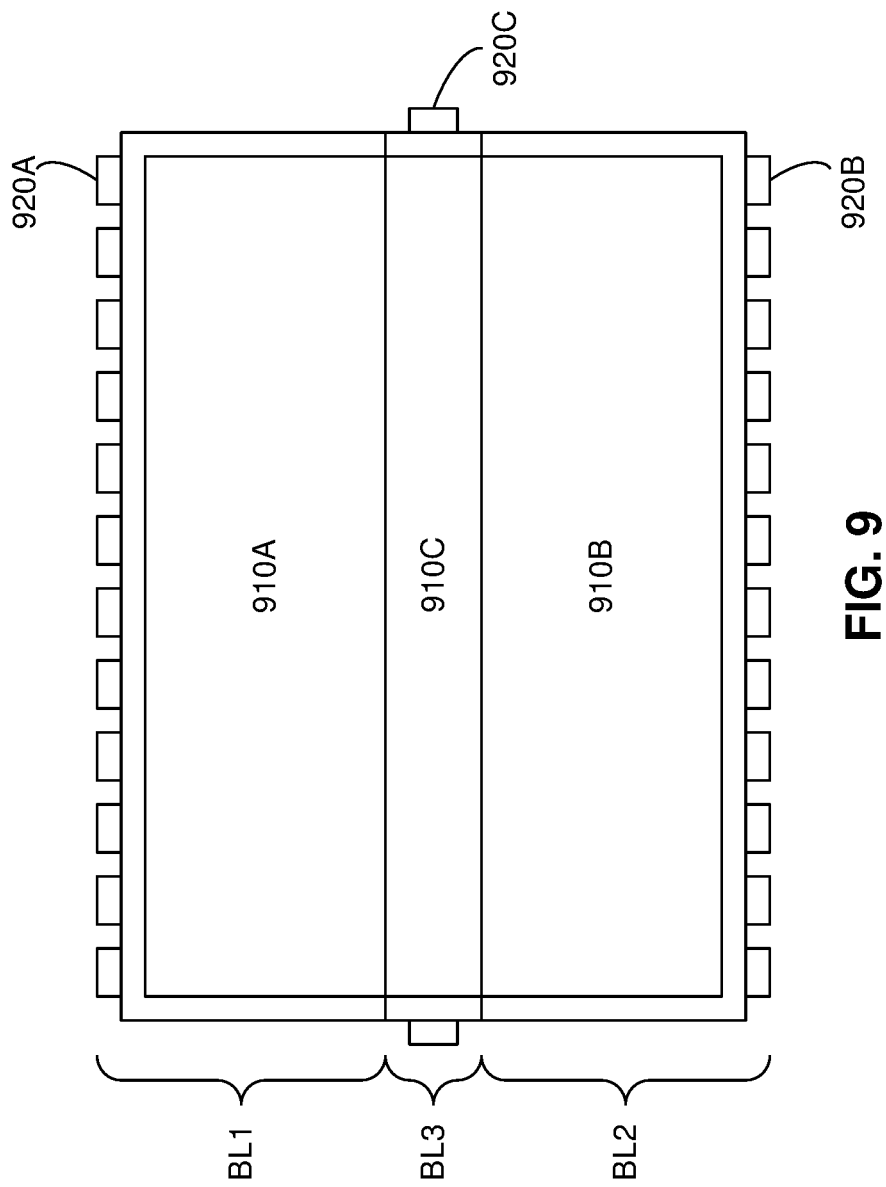
FIG. 9 is a top view of the backlight unit of FIG. 8, in accordance with an embodiment.

FIG. 9 is a top view of the backlight unit of FIG. 8, in accordance with an embodiment. The first segment backlight unit BL1 includes a light guide 910A and multiple light sources 920A located on the top portion of the light guide 910A. The second segmented backlight unit BL2 includes a light guide 910B and multiple light sources 920B located at the bottom of the light guide 910B. The third segmented backlight unit BL3 includes a light guide 910C located in between the light guides 910A and 910B, and one or more light sources 920C located on the left and/or right side of the light guide 910C.

The third segmented backlight unit is located in the central portion of the electronic display 115. A user viewing may pay more attention to the central portion of the electronic display 115. Furthermore, the central portion of the electronic display 115 may correspond to fovea of the user's eye. As such, including a third backlight unit BL3 can increase the quality of the image perceived by the user.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A backlight of a display device comprising:
   a first backlight unit corresponding to a first liquid crystal portion of a liquid crystal layer of the display device, the first backlight unit including:
   one or more light sources, and
   a first light guide for guiding light generated by the one or more light sources of the first backlight unit onto the first liquid crystal portion, wherein the one or more light sources of the first backlight unit are disposed on a first side of the first light guide;
   a second backlight unit corresponding to a second liquid crystal portion of the liquid crystal layer, the second backlight unit including:
   one or more light sources, and
   a second light guide for guiding light generated by the one or more light sources of the second backlight unit onto the second liquid crystal portion, wherein the one or more light sources of the second backlight unit are disposed on a second side of the second light guide, opposite to the first side of the first light guide; and
   a third backlight unit corresponding to a third liquid crystal portion of the liquid crystal layer, the third backlight unit including:
   one or more light sources, and
   a third light guide for guiding light generated by the one or more light sources of the third backlight unit onto the third liquid crystal portion, wherein the one or more light sources of the third backlight unit are disposed on a third side of the third light guide, perpendicular to the first side of the first light guide and the second side of the second light guide.

2. The backlight of claim 1, wherein the backlight further comprises:
   an air gap between the first backlight unit and the third backlight unit, the air gap reducing an amount of light transferring between the first backlight unit into the third backlight unit.

3. The backlight of claim 1,
   wherein the first light guide is disposed on a first side of the third light guide,
   wherein the second light guide is disposed on a second side of the third light guide, opposite to the first side of the third light guide.

4. The backlight of claim 1, further comprising:
   a controller for controlling the liquid crystal layer and the backlight, the controller providing a first pulse to the first liquid crystal portion during a first portion of a frame, and providing a second pulse to the second liquid crystal portion during a second portion of the frame, the first and second pulses for programming the first and second liquid crystal portions.

5. The backlight of claim 4, wherein the controller further provides a third pulse to the first backlight unit during the second portion of the frame, and provides a fourth pulse to the second backlight unit during the first portion of the frame, the third and fourth pulses for instructing the first and second backlight units to emit light.

6. The backlight of claim 1, wherein the first light guide comprises a plurality of scattering elements, wherein a density of the scattering elements increases as a distance between a scattering element and the one or more light sources increases.

7. The backlight of claim 1, wherein the first light guide comprises a plurality of scattering elements, wherein a size of scattering elements increases as a distance between the scattering element and the one or more light sources increases.

8. The backlight of claim 1, further including a homogenizing strip disposed on portions of the first and third backlight units where the first and third backlight units adjoin.

9. A method comprising:
providing a first pulse to a first liquid crystal portion of a liquid crystal layer during a first portion of a frame, the first pulse for programming the first liquid crystal portion;
providing a second pulse to a second liquid crystal portion of the liquid crystal layer during a second portion of the frame, the second pulse for programming the second liquid crystal portion;
providing a third pulse to a third liquid crystal portion of the liquid crystal layer during a third portion of the frame, the third pulse for programming the third liquid crystal portion;
providing a fourth pulse to a first backlight unit corresponding to the first liquid crystal portion during the second portion of the frame, the fourth pulse for instructing the first backlight unit to emit light from a first side of the first backlight unit;
providing a fifth pulse to a second backlight unit corresponding to the second liquid crystal portion during the third portion of the frame, the fifth pulse for instructing the second backlight unit to emit light from a second side of the second backlight unit, opposite to the first side of the first light guide; and
providing a sixth pulse to a third backlight unit corresponding to the third liquid crystal portion during the first portion of the frame, the sixth pulse for instructing the third backlight unit to emit light from a third side of the third backlight unit, perpendicular to the first side of the first light guide and the second side of the second light guide.

10. The method of claim 9, wherein further comprising:
providing a first plurality of electrical signals to the first liquid crystal portion during the first portion of the frame, the first plurality of electrical signals causing the first liquid crystal portion to have a state according to an image data; and
providing a second plurality of electrical signals to the second liquid crystal portion during the second portion of the frame, the second plurality of electrical signals causing the second liquid crystal portion to have a state according to the image data.

11. A display device comprising:
a liquid crystal layer, the liquid crystal layer including:
a first liquid crystal portion, the first liquid crystal portion including a first plurality of pixels,
a second liquid crystal portion, the second liquid crystal portion including a second plurality of pixels, and
a third liquid crystal portion between the first liquid crystal portion and the second liquid crystal portion, the third liquid crystal portion including a third plurality of pixels; and
a backlight, the backlight including:
a first backlight unit corresponding to the first liquid crystal portion, the first backlight unit including:
one or more light sources, and
a first light guide for guiding light generated by the one or more light sources of the first backlight unit onto the first liquid crystal portion, wherein the one or more light sources of the first backlight unit are disposed on a first side of the first light guide, and
a second backlight unit corresponding to the second liquid crystal portion, the second backlight unit including:
one or more light sources, and
a second light guide for guiding light generated by the one or more light sources of the second backlight unit onto the second liquid crystal portion, wherein the one or more light sources of the second backlight unit are disposed on a second side of the second light guide, opposite to the first side of the first light guide, and
a third backlight unit corresponding to the third liquid crystal portion, the third backlight unit comprising:
one or more light sources, and
a third light guide for guiding light generated by the one or more light sources of the third backlight unit onto the third liquid crystal portion, wherein the one or more light sources of the third backlight unit are disposed on a third side of the third light guide, perpendicular to the first side of the first light guide and the second side of the second light guide.

12. The display device of claim 11, wherein the backlight further comprises:
an air gap between the first light guide and the third light guide, the air gap reducing an amount of light transferring between the first light guide into the third light guide.

13. The display device of claim 11, wherein the first backlight unit further comprises:
a coating at a side of the first light guide facing the third light guide, the coating preventing light from transferring between the first light guide and the third light guide.

14. The display device of claim 11, further comprising:
a controller for controlling the liquid crystal layer and the backlight, the controller providing a first pulse to the first liquid crystal portion during a first portion of a frame, and providing a second pulse to the second liquid crystal portion during a second portion of the frame, the first and second pulses for programming the first and second liquid crystal portions.

15. The display device of claim 14, wherein the controller further provides a third pulse to the first backlight unit during the second portion of the frame, and provides a fourth pulse to the second backlight unit during the first portion of the frame, the third and fourth pulses for instructing the first and second backlight units to emit light.

16. The display device of claim 11, wherein the first light guide comprises a plurality of scattering elements, wherein a density of the scattering elements increases as a distance between a scattering element and the one or more light sources increases.

17. The display device of claim 11, wherein the first light guide comprises a plurality of scattering elements, wherein a size of scattering elements increases as a distance between the scattering element and the one or more light sources increases.

18. The display device of claim 11, further including a homogenizing strip disposed on portions of the first and third backlight units where the first and third backlight units adjoin.

* * * * *